United States Patent [19]

Watanabe

[11] Patent Number: 5,097,290
[45] Date of Patent: Mar. 17, 1992

[54] SCANNER FOR SCANNING AN OBJECT FROM A PLURALITY OF POSITIONS

[75] Inventor: Junji Watanabe, Kanagawa, Japan

[73] Assignee: Kabushiki Kaisha Toshiba, Kanagawa, Japan

[21] Appl. No.: 494,324

[22] Filed: Mar. 16, 1990

[30] Foreign Application Priority Data

Mar. 16, 1989 [JP] Japan ............................... 1-064321
Mar. 16, 1989 [JP] Japan ............................... 1-064322

[51] Int. Cl.⁵ ............................................. G03B 27/70
[52] U.S. Cl. .................................. 355/60; 355/57; 355/61; 355/235
[58] Field of Search ................ 355/55, 56, 57, 60, 355/61, 235

[56] References Cited

U.S. PATENT DOCUMENTS

| | | |
|---|---|---|
| 4,256,400 | 3/1981 | Komori . |
| 4,334,762 | 6/1982 | Landa ............................... 355/57 |
| 4,561,770 | 12/1985 | Yamaguchi et al. ............... 355/60 |
| 4,650,317 | 3/1987 | Oushiden et al. ................. 355/235 |
| 4,666,288 | 5/1987 | Watanabe . |
| 4,739,372 | 4/1988 | Watanabe . |
| 4,740,811 | 4/1988 | Watanabe . |

*Primary Examiner*—Monroe H. Hayes
*Attorney, Agent, or Firm*—Banner, Birch, McKie & Beckett

[57] ABSTRACT

A copying machine has an optical unit for forming a latent image on a photosensitive drum which corresponds to an original document supported for copying on a glass table of the copying machine. The copying machine is operable in two copying modes, in which the document is positioned at either a left reference mark on the glass table or at a right reference mark. The optical unit includes four (4) mirrors for scanning the original document and a lens, which are supported for movement on a plurality of carriages. In the left reference mode, a document to be copied is positioned at the left side of the glass table. The first carriage, which supports a first mirror, is moved to scan the document to be copied. A second carriage, which supports a second and third mirror, is also moved during the scanning operation but at one-half the speed of the first carriage. In the right reference mode, a document to be copied is set at the right side of the glass table. In this mode, before the start of the scanning operation, the first carriage is first moved to a maximum copyable position in the left reference mode. Then, the first carriage is moved further beyond the maximum copyable position. At the same time, either the second, third and fourth carriages are moved, or only the fourth carriage is moved so that length of the optical path from the document to the lens is equal to the length of the optical path from the lens to the surface of the photosensitive drum.

13 Claims, 12 Drawing Sheets

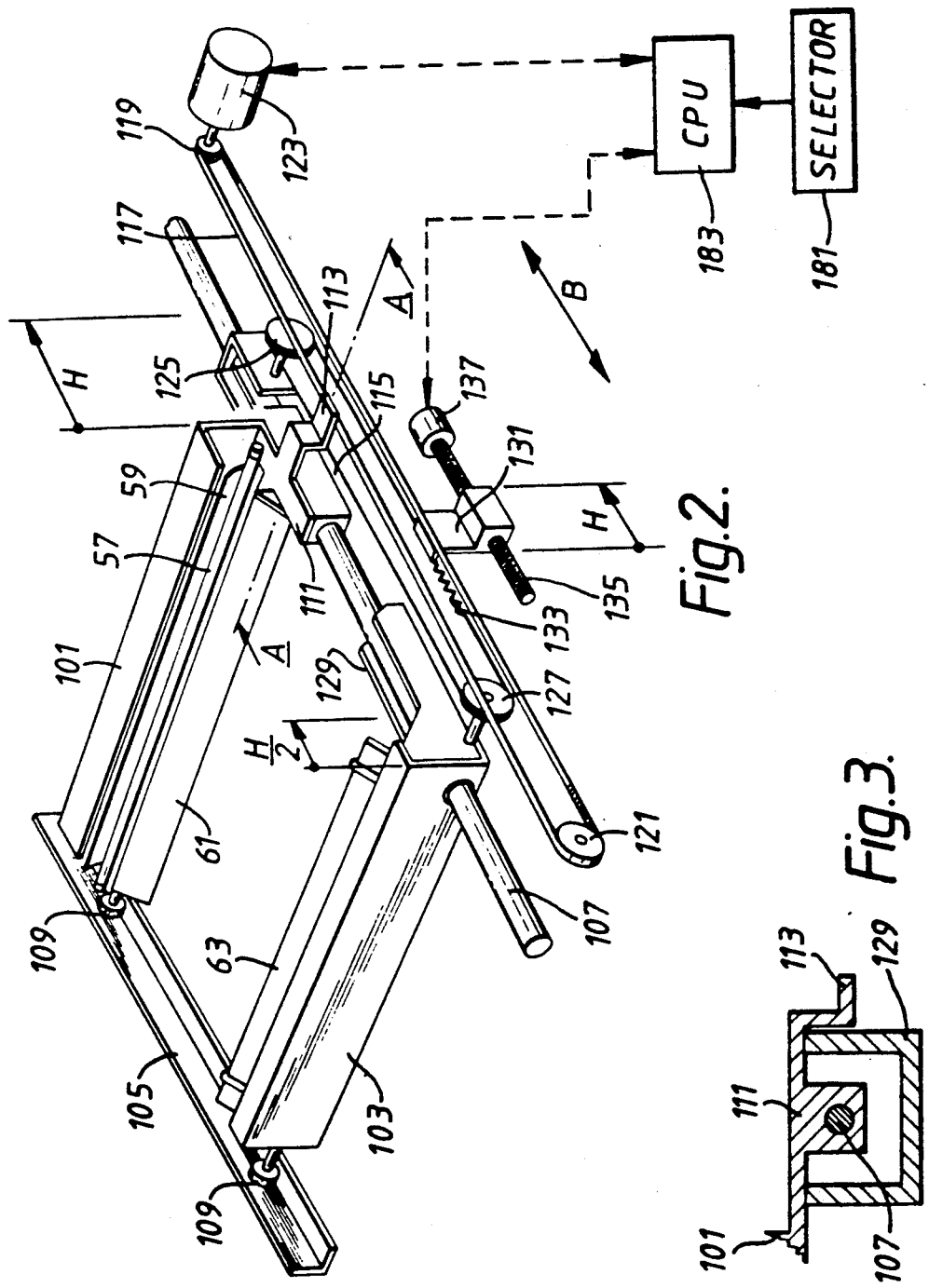

SCANNER FOR SCANNING AN OBJECT FROM A PLURALITY OF POSITIONS

BACKGROUND OF THE INVENTION

1. Field of the Invention

This invention relates generally to a scanner for scanning an object from a plurality of positions, and more particularly to a scanner used in a copying apparatus for scanning a document which may be set in a plurality of positions.

2. Description of the Related Art

A copying machine has an optical unit for forming a latent electrostatic image on a photosensitive drum which corresponds to an original document supported on a glass table. The optical unit includes a lens which focuses a light image of the document onto the drum to form the electrostatic image. The size of the copying machine is directly affected by the focal length of the lens so as the focal length of the lens increases, the size of the copy machine also increases. It is important, therefore, in the miniaturization of a copying machine that the focal length of the lens be made as short as possible.

Most copying machines have a glass table on which the document to be copied is supported. Typically, the size of the glass table is larger than the maximum size document (hereinafter referred to as the maximum copyable size) that the copying machine is able to copy. A reference mark for use in positioning documents for copying is typically located at the left side of the glass table. If a document of the maximum copyable size is set on the glass table at the left reference mark, a portion of the glass table is not covered by the document, i.e., a blank portion is present on the glass table. The optical unit moves within the range defined by the maximum copyable size document, but not in the blank portion.

It is desirable to use the blank portion for setting a document for copying. This would require that the optical unit move in the blank portion, which, in turn, would require that the focal length of the lens be increased. Increasing the focal length of the lens would then cause the size of the copying machine to be increased, which is undesirable.

SUMMARY OF THE INVENTION

Accordingly, it is an object of the present invention to provide a scanner for use in a copying machine, or the like, which allows scanning of a larger area of the glass table without any accompanying increase in the size of the optical unit.

It is a further object of the present invention to provide a copying machine for copying documents set at a plurality of positions.

A scanner in accordance with the present invention comprises light means for illuminating a document through a glass table of a copying machine. Input mirror means reflects the light reflected by the document to lens means which focuses the reflected light. Output mirror means is also provided, and reflects the light focused by the lens means onto a light-receiving medium. First positioning means positions the input mirror means along the lower surface of the glass table at the start of the scanning operation and reciprocally moves the input mirror means between the left and right ends of the glass table during the scanning operation. Second positioning means positions the output mirror means at the start of the scanning operation so that the length of the optical path between the document and the lens is equal to the optical distance between the lens and the light receiving medium after the input mirror means has been positioned.

BRIEF DESCRIPTION OF THE DRAWINGS

Other objects and many of the attendant advantages of this invention will be readily appreciated as the same become better understood by reference to the following detailed description when considered in connection with the accompanying drawings, in which like reference numerals designate the same or similar parts throughout the figures thereof and wherein:

FIG. 2 is a perspective view of a mechanism for moving a first carriage and a second carriage used in the copying machine shown in FIG. 1;

FIG. 3 is a sectional view taken along line A—A of FIG. 2;

DETAILED DESCRIPTION OF THE PREFERRED EMBODIMENTS

Figure 1:
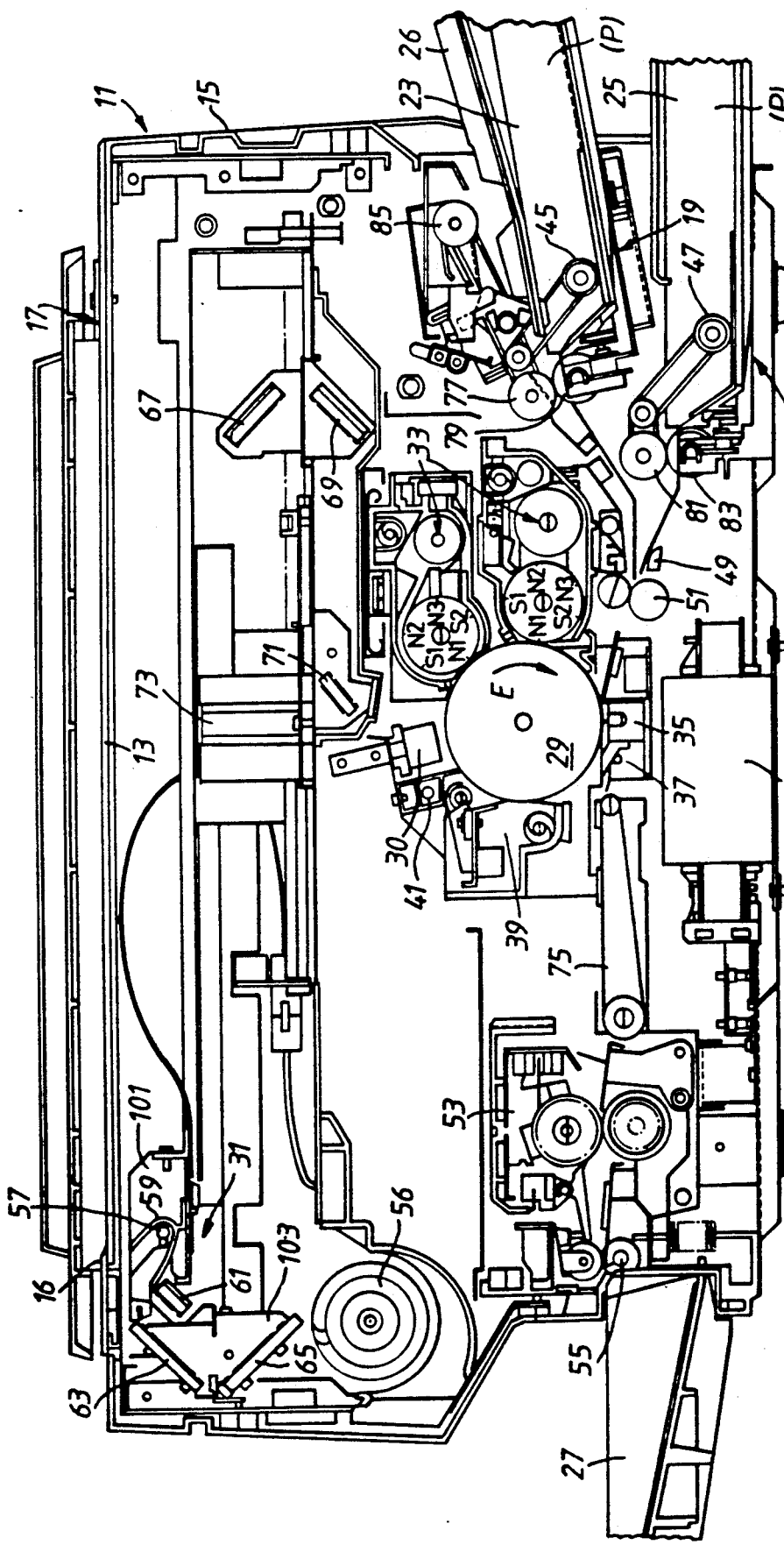
FIG. 1 is a sectional view of a copying machine according to the present invention.

Referring now to FIG. 1, a copying machine 11 includes a glass document table 13 provided on the top of a body 15 of copying machine 11 for supporting a document D to be copied.

A first scale 16 is provided at the left end of glass document table 13. A second scale 17 is provided at the right end of the glass document table. First and second scales 16 and 17 serve as reference marks for positioning document D for copying. As described later, copying machine 11 has two copying modes, each of which uses one of the first and second scales 16 and 17, respectively. An operating panel (not shown) is provided adjacent glass document table 13 for accepting user operating commands and providing operating information. An upper feeder 19 and a lower feeder 21 are provided at the right side of body 15 for feeding paper sheets P one-by-one from a stack of paper sheets P contained in an upper cassette 23 and a lower cassette 25. A manual paper feeder 26, which forms the cover of upper cassette 23, is also provided, and feeds a paper sheet P manually if the need arises. A tray 27 is provided at the left-hand side of body 15 for receiving the finished copy paper sheets.

A photosensitive drum 29 is disposed substantially at the center of body 15. Disposed adjacent photosensitive drum 29 is a charger 30 for charging the surface of photosensitive drum 29 at a uniform potential. An optical system 31, as described later, exposes the charged surface of photosensitive drum 29 to form a latent image corresponding to document D. A developing unit 33 develops the latent image on the surface of photosensitive drum 29 with a toner. A transferring unit 35 transfers the developed image onto a paper sheet P. A separating unit 37 separates paper sheet P with the developed image from the surface of photosensitive drum 29. A cleaning unit 39 scrapes off the residual toner from the surface of photosensitive drum 29, and a discharging unit 41 erases the residual charge on the surface of photosensitive drum 29 after the residual toner has been scraped off.

In operation, a paper sheet P is transported from upper cassette 23 or lower cassette 25 to tray 27 through a transferring position at which the developed image is transferred onto paper sheet P. A first pickup roller 45 transports paper sheets from upper cassette 23, and a second pickup roller 47 transports paper sheets from lower cassette 25. Paper sheets are manually fed from manual paper feeder 26. In each case, the paper sheets are transported along a paper path to tray 27 through the transferring position. A paper stop switch 49, aligning rollers 51, heat rollers 53 and discharging rollers 55 are also disposed in this order along the paper path, as will be explained.

Copying machine 11 also includes a cooling fan 56 for cooling the interior of the copying machine.

Optical system 31 includes an exposure lamp 57, the back of which is covered with a reflector 59. Exposure lamp 57 illuminates document D through the glass table. The light image is then reflected through a series of mirrors 61, 63, 65, 67, 69 and 71 to a lens 73 which focuses the light image onto the surface of photosensitive drum 29.

Optical system 31 is movable and moves to scan the document and progressively form an electrostatic image of the document on the photosensitive drum. Photosensitive drum 29 is driven in the direction of arrow E (shown in FIG. 1) by a driving mechanism (not shown) in synchronism with the movement of optical system 31. At the time of copying, photosensitive drum 29 is uniformly charged by charger 30. Subsequently, document D is uniformly illuminated by exposure lamp 57, so that the image on document D is projected onto photosensitive drum 29 through optical system 31. A latent image is formed on the surface of photosensitive drum 29 which corresponds to document D, and the latent image is developed by developing unit 33.

At the start of the copying operation, a paper sheet P, which is fed automatically or manually, is transported to aligning rollers 51 through paper stop switch 49. Once paper stop switch 49 detects the presence of paper at the aligning rollers, aligning rollers 51 are caused to rotate synchronously with the rotation of photosensitive drum 29. Paper sheet P is then fed along a path between photosensitive drum 29 and transferring unit 35, where a toner image is transferred onto paper sheet P. Separating unit 37 separates paper sheet P with the developed image from the drum, and paper sheet P is then guided to heat rollers 53 by a belt 75. The transferred image is fixed by heat rollers 53, and paper sheet P with the fixed image is then discharged to tray 27 by discharging rollers 55.

Upper and lower cassettes 23 and 25 are removably mounted in upper and lower feeders 19 and 21, respectively. In response to the insertion of upper cassette 23, first pickup roller 45 is moved down onto paper P in upper cassette 23 by a driver (not shown). When upper cassette 23 is selected, in response to the operation of a print key on the operating panel, first pickup roller 45 is rotated so that the top sheet of paper P in upper cassette 23 is picked up from upper cassette 23.

A feeding roller 77 and a separating roller 79, positioned near the outlet of upper cassette 23, cooperate to transport paper sheets one by one from upper cassette 23.

Lower cassette 25 is mounted in lower feeder 21, which includes second pickup roller 47, and feeding and separating rollers 81 and 83. The operation of lower feeder 21 is the same as described above with respect to upper feeder 19.

When paper sheet P is manually loaded into manual paper feeder 26, a manual feed switch (not shown) detects the paper, and a manual feeding roller 85 is lowered and rotated by a driving mechanism (not shown) to feed paper sheet P to a position between feeding roller 77 and separating roller 79 of upper feeder 19. Paper sheet P is then fed toward aligning rollers 51.

Copying machine 11 also includes a voltage transformer 87 for transforming an externally supplied voltage to a voltage suitable for operating copying machine 11.

The detail of optical system 31 will now be explained.

As described above, optical system 31 defines an optical path from document D on table 13 to the surface of photosensitive drum 29. As is well known, in a usual copying operation, optical system 31 is moved so that the length of the optical path remains constant during the copying process.

As shown in FIG. 2, exposure lamp 57, reflector 59 and first mirror 61 are mounted on a first carriage 101. Second and third mirrors 63 and 65 (see FIG. 1) are mounted on a second carriage 103. During the copying process, first and second carriages 101 and 103 are reciprocally transported from right to left or from left to right along document glass table 13.

Still referring to FIG. 2, the mechanism for transporting first and second carriages 101 and 103 will be explained.

First and second carriages 101 and 103 are transported along a guide rail 105 and a guide shaft 107 disposed parallel to guide rail 105. Rollers 109 are provided at the left ends of first and second carriages 101 and 103, and are rotatably mounted on guide rail 105. An arm portion 111 is positioned at the right end of first carriage 101 and is slidably mounted on guide shaft 107. Arm portion 111 has a connecting portion 113, which extends perpendicular to first mirror 61. Connecting portion 113 is coupled to a wire 115 and a timing belt 117. Timing belt 117 is wound around a rotatable pulley 119 and an idle pulley 121. A pulse motor 123 drives pulley 119. A guide 129 is coupled to the right side of second carriage 103, and extends perpendicular to second and third mirrors 63 and 65 (see FIG. 1), and parallel to guide shaft 107. Rotatable pulleys 125 and 127 are mounted on guide 129, and wire 115 is wound around each of the pulleys. In FIG. 2, guide 129 is partially cut away for convenience of illustration.

FIG. 3 is a sectional view taken along line A—A of FIG. 2, and shows the relationship between arm portion 111 of first carriage 101 and guide 129 of second carriage 103. As shown in the figure, guide shaft 107 extends through arm portion 111 and guide 129. Arm portion 111 is positioned inside guide 129, and connecting portion 113 extends over guide 129.

Referring again to FIG. 2, wire 115 is directly coupled at one of its ends to an adjusting piece 131. The other end of wire 115 is coupled to adjusting piece 131 through a coiled spring 133. A threaded hole is provided in adjusting piece 131 to receive a male screw 135. A pulse motor 137 drives male screw 135 so that adjusting piece 131 is reciprocally moved along arrow B in response to the rotation of pulse motor 137.

In the above arrangement, when pulse motor 123 is activated, pulley 119 is rotated which, in turn, causes movement of timing belt 117. Movement of timing belt 117 then causes first carriage 101, including connecting portion 113, to move along arrow B in FIG. 2.

Movement of connecting portion 113 also affects movement of second carriage 103 because connecting portion 113 is connected to rotatable pulleys 125 and 127 of guide 129 of second carriage 103 through wire 115. Thus, as connecting portion 113 is moved, second carriage 103 is also moved.

When pulse motor 123 is activated, rotatable pulleys 125 and 127 serve as a running block so that second carriage 103 is moved at one-half of the speed of first carriage 101, while travelling in the same direction as the first carriage. The direction of first and second carriages 101 and 103 is changed by reversing the rotational direction of pulse motor 123.

When pulse motor 137 only is activated, i.e., when pulse 123 is not activated, adjusting piece 131 is caused to move along arrow B. As adjusting piece 131 moves, only second carriage 103 is moved through wire 115, and first carriage 101 remains fixed. Pulleys 125 and 127 serve as a running block during rotation of pulse motor 137 in the same manner as described above with respect to pulse motor 123. Thus, if adjusting piece 131 is moved by length H, second carriage 103 is moved by a distance equal to one-half of length H.

Figure 4:
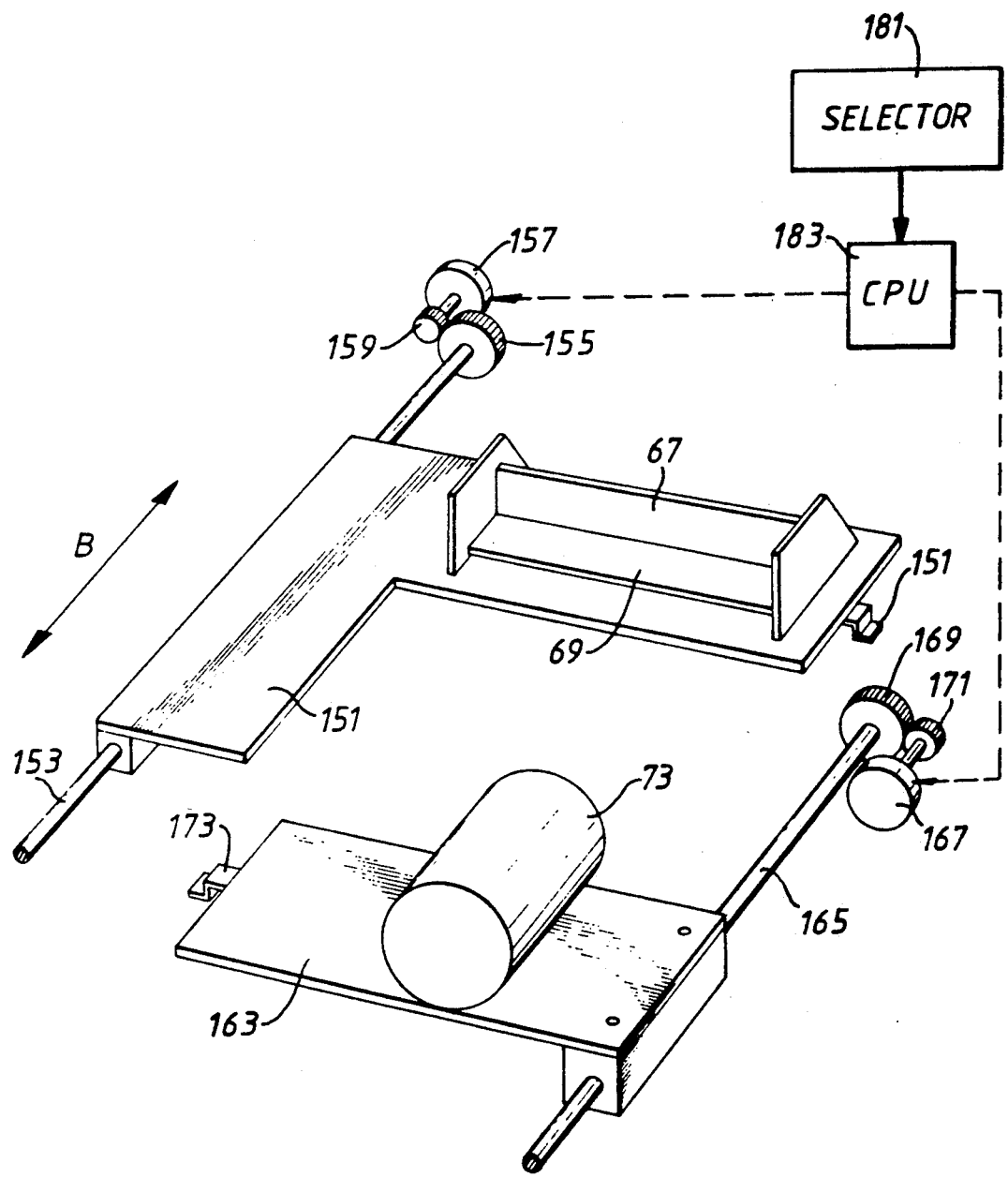
FIG. 4 is a perspective view of a mechanism for driving a third carriage and a fourth carriage used in the copying machine shown in FIG. 1.

Referring to FIG. 4, a mechanism for transporting fourth and fifth mirrors 67 and 69 and lens 73 will be explained.

Fourth and fifth mirrors 67 and 69 are mounted on a third carriage 151. A spiral shaft 153 extends through one side of third carriage 151, and is connected at one end to a gear 155. Gear 155 is driven by a pulse motor 157 through a gear 159. A projection 161 is located under the other side of third carriage 151 and serves as a supporting element for the carriage. As pulse motor 157 is rotated, third carriage 151 is moved along arrow B in FIG. 4.

Lens 73 is mounted on a fourth carriage 163. A spiral shaft 165 extends through one side of fourth carriage 163, and a projection 173 is located under the other side of the fourth carriage. Spiral shaft 165 is connected at one of its ends to a pulse motor 167 through gears 169 and 171. Fourth carriage 163 is moved along arrow B in FIG. 4 with the rotation of pulse motor 167.

As described above, copying machine 11 has two copying modes. In one copying mode, document D, set at first scale 16 (see FIG. 1), is copied. Hereinafter, the copying operation is this copying mode is referred to as a left reference operation. In the other copying mode, document D, set at second scale 17, is copied. Hereinafter, the copying operation in this mode is referred to as a right reference operation.

An operator operates a selector 181 (see FIGS. 2 and 4), located on the operating panel, to select a copying mode. Selector 181 then outputs a signal, indicating the selected copying mode, which is received by a scanning controller in the form of CPU 183. CPU 183 then controls pulse motors 123, 137, 157 and 167 in response to the output signal, as will be described.

Figure 5:
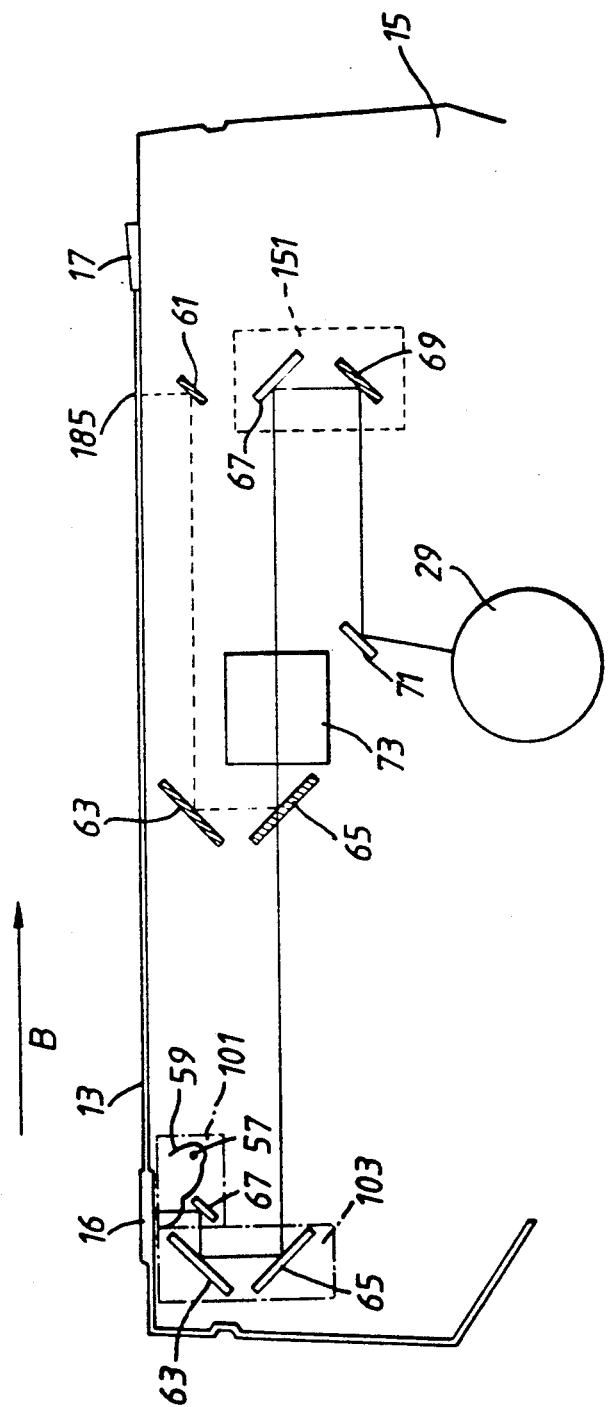
FIGS. 5 and 6 illustrate the movement of mirrors and a lens used in the copying machine shown in FIG. 1.
Figure 6:
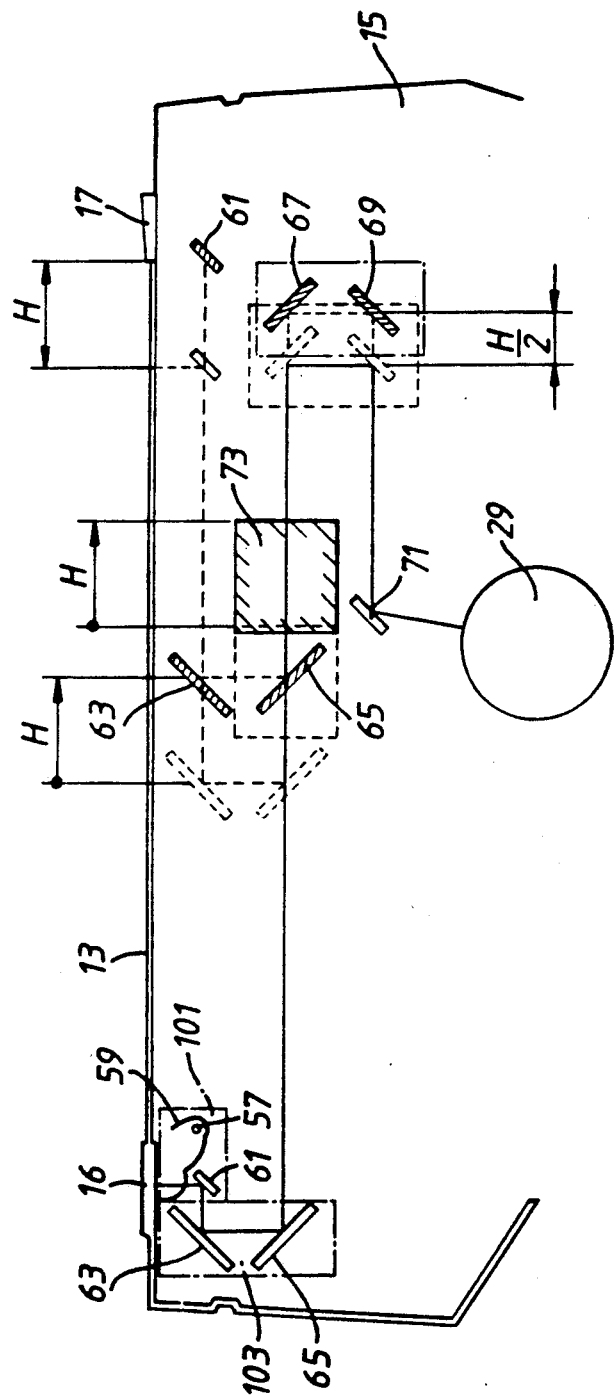
Figure 7:
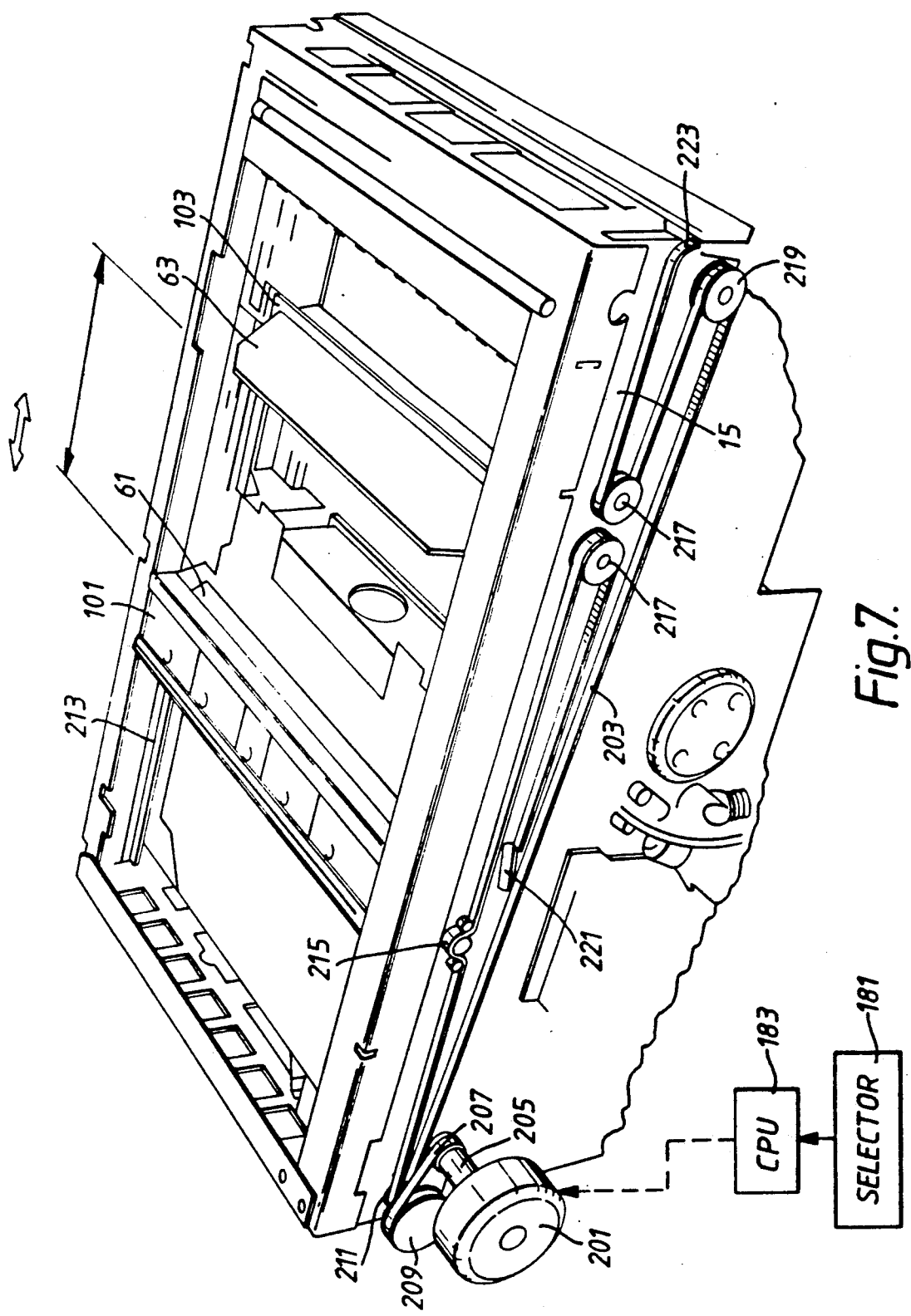
FIG. 7 is a perspective view of a portion of a copying machine according to a second embodiment of the present invention.

Referring now to FIGS. 5, 6, and 7, the movement of first, second, third and fourth carriages 101, 103, 151 and 163 during the copying operation will be described.

FIG. 5 shows the scanning movement of mirrors 61, 63, 65, 67, 69 and 71 and lens 73 in the left reference operation, i.e., in the case where document D is set at first scale 16.

In the left reference operation, in response to the operation of selector 181, CPU 183 controls the movement of the carriages during the scanning operation so that only first and second carriages 101 and 103 are moved in the direction of arrow B in FIG. 5. Because second carriage 103 is moved at one-half the speed of first carriage 101, the length of the optical path from document D to the surface of photosensitive drum 29 remains constant during the scanning operation.

In the left reference operation, first carriage 101, i.e., first mirror 61, is moved to the right as far as a point 185 (hereinafter referred to as the maximum stroke point) corresponding to the maximum length of document D to be copied. Then, when the scanning operation is complete, first and second carriages 101 and 103 are returned to their original positions at the left end of glass table 13.

FIG. 6 illustrates the movement of mirrors 61, 63, 65, 67, 69 and 71 and lens 73 in the right reference operation, i.e., in the case where document D is set at second scale 17.

In the right reference operation, before the scanning operation is begun, the mirrors are positioned in the following manner. First, first carriage 101 is moved as far as maximum stroke point 185. At the same time, second carriage 103 is also moved at one-half the speed of the first carriage. First and second carriages 101 and 103, thus, occupy the same positions as described above with respect to the left reference operation.

Pulse motor 123, under the control of the CPU 183, is then further rotated so that first carriage 101 is moved an additional length H beyond maximum stroke point 185, and second carriage 103 is moved by length H/2, i.e., half of that of first carriage 101, through wire 115 and pulleys 125 and 127.

At the same time, pulse motor 167 is also activated by CPU 183, and causes fourth carriage 163 with lens 73 to move to right by length H (see FIGS. 4 and 6). Thereafter, pulse motor 137 is driven so that adjusting piece 131 is moved to the right (in FIG. 2) by length H. This then causes second carriage 103 to be further moved by length H/2, i.e., for a cummulative distance of length H (H/2 + H/2).

Also to ensure that the length of the optical path remains constant, pulse motor 157 is driven so that third carriage 151 with fourth and fifth mirrors 67 and 69 is moved by length H/2 away from lens 73.

After mirrors 61, 63, 65, 67 and 69 and lens 73 are positioned as described above, the scanning operation is begun. That is, first carriage 101 is moved along glass document table 13 to the left beyond second scale 17 by a distance equal to the distance from first scale 16 to maximum stroke point 185. Second carriage 103 is moved in the same direction as first carriage 101 and at one half the speed of first carriage 101. Then, when the scanning operation is complete, first and second carriages 103 are returned to their original positions at the start of the left reference operation, at the left end of glass table 13. Third and fourth carriages 151 and 163 are also returned to their original positions in the left reference operation after the scanning operation is completed. Alternatively, when the scanning operation is complete, first and second carriages 101 and 103 may be returned to their original positions before the start of the scanning operation at the right end of glass table 13.

Figure 13:
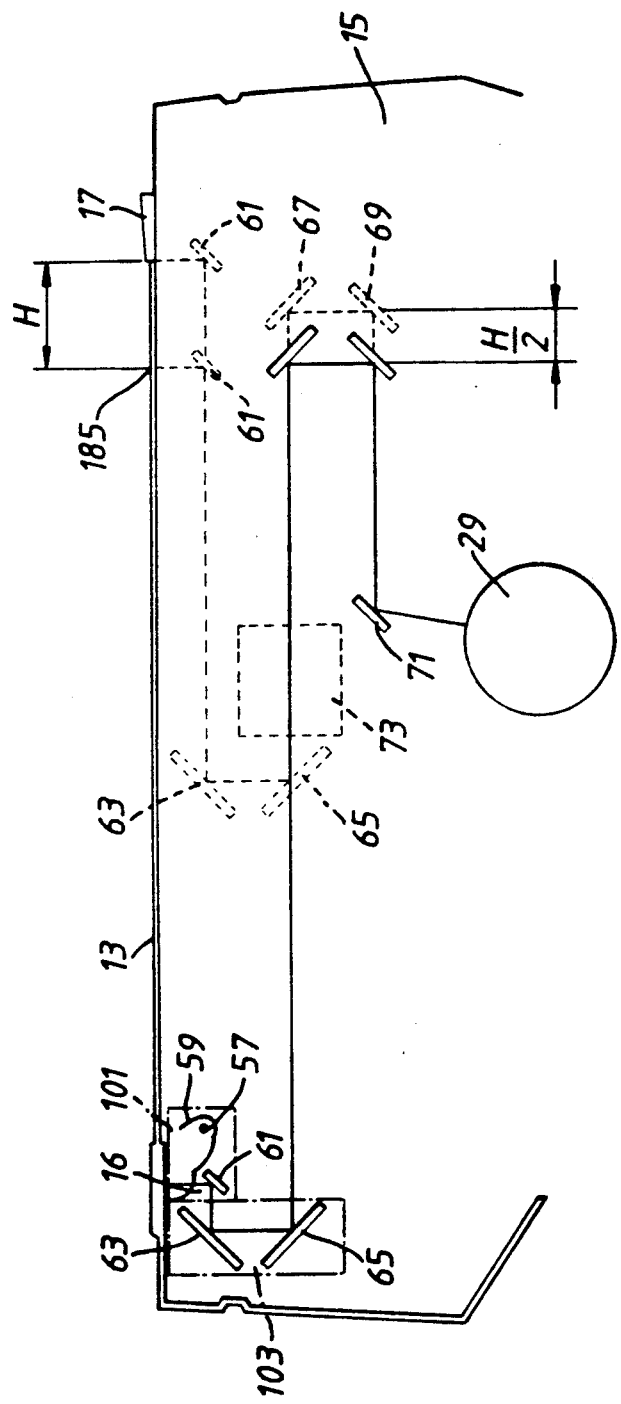

In describing the left reference operation here and later with respect to the second embodiment, it is assumed that carriages 101, 103, 151 and 163 are initially positioned at the left end of glass table 13, as shown in FIGS. 5 and 13. However, if the carriages are instead positioned at the right end of the glass table when the left reference operation is selected, it is necessary to first position the carriages at the left end of glass table 13, in a manner substantially similar to that described with respect to the right reference operation, before beginning the scanning operation.

As can be seen, although the scanning area is different in the right reference operation than in the left reference operation, i.e., it begins at the right end, rather than the left end, of the glass table, the space provided for optical unit 31 is the same as that in the left reference operation so that the size of copying machine is the same as that capable of copying only in the left reference operation, and need not be increased.

Referring now to FIG. 7, a second embodiment of this invention will be explained. According to the second embodiment, the mechanism for moving first and second carriages 101 and 103 includes a pulse motor 201 for driving a timing belt 203 through a shaft 205, a belt 207, a pulley 209 and a first fixed pulley 211.

First and second carriages 101 and 103 are moved along a first guide 213 and a second guide (not shown) positioned parallel to the first guide. First carriage 101 has a pair of pulleys 215 located on the respective side surfaces of first carriage 101. Second carriage 103 has a pair of pulleys 217 located on each of the side surfaces of second carriage 103. Timing belt 203 is wound around first fixed pulley 211, pulley 215, pulleys 217 and a second fixed pulley 219. First and second fixed pulleys 211 and 219 are located at either end of the rear side of body 15. Timing belt 203 is fixed to the rear surface of body 15 through first and second fixing elements 221 and 223. Pulse motor 201 is electrically coupled to CPU 183, and CPU 183 is coupled to selector 181, as previously described.

Figure 8:
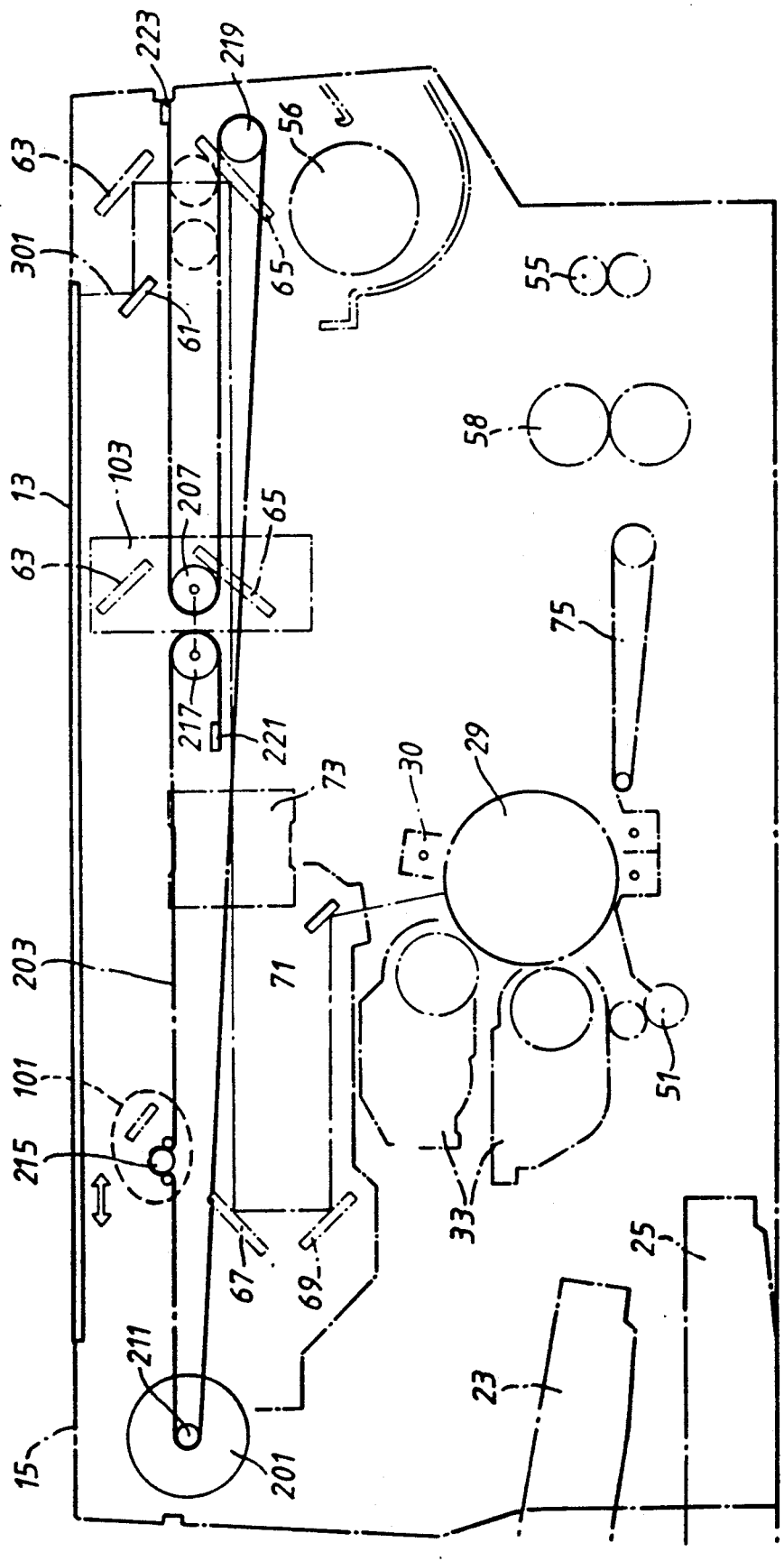
FIG. 8 is a rear view of the copying machine shown in FIG. 7.

FIG. 8 illustrates the mechanism for moving first and second carriages 101 and 103.

To explain, in operation, pulse motor 201 moves timing belt 203 through shaft 205, belt 207, pulleys 209 and 211. As timing belt 203 is moved, pulley 215 is rotated and causes first carriage 101 to move to the right (in FIG. 8). At the same time, second carriage 103 is also moved by rotation of pulleys 217 in the same direction as first carriage 101, and at one-half the speed of the first carriage.

Figure 9:
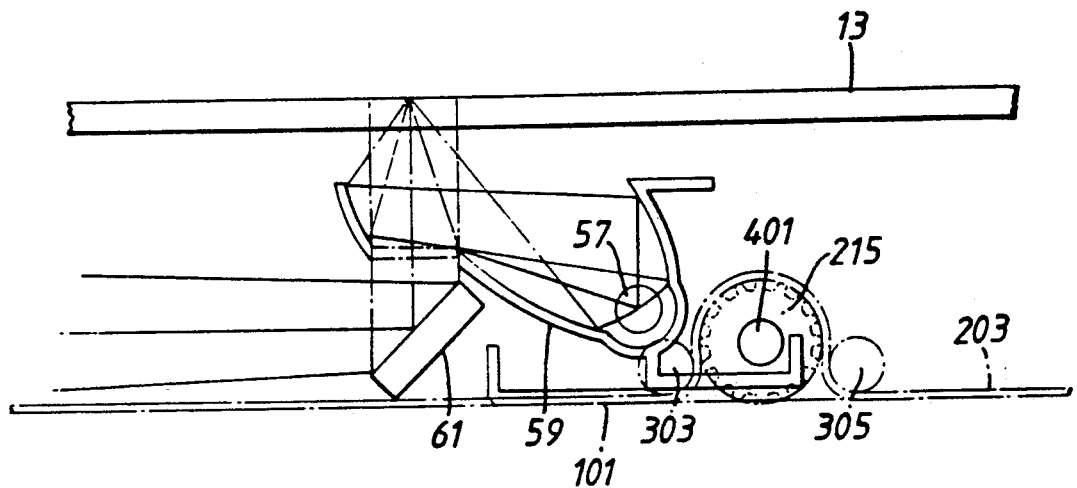
FIG. 9 is a side view of a first carriage used in the copying machine shown in FIG. 7.

FIG. 9 shows an enlarged view of the area surrounding pulley 215 of first carriage 101.

Timing belt 203 is wound about pulley 215 of first carriage 101 through a pair of idle pulleys 303 and 305. The contact area between timing belt 203 and pulley 215 is sufficiently large so that timing belt 203 drives pulley 215 or pulley 215 drives timing belt 203 precisely.

Figure 10:
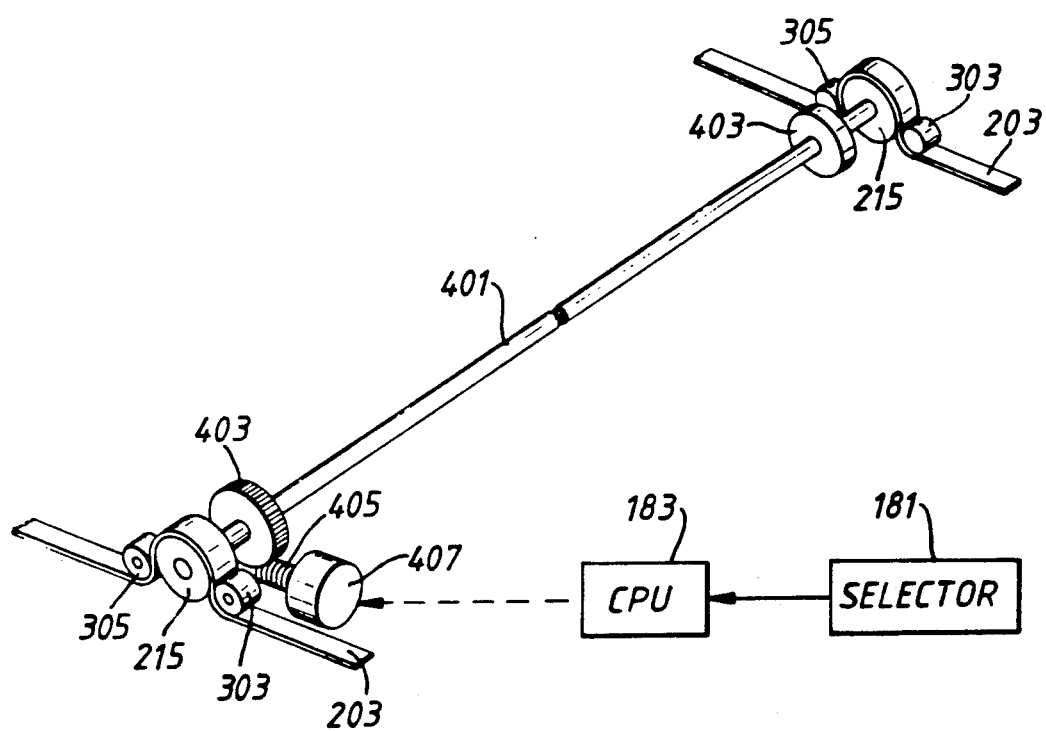
FIG. 10 is a perspective view of a mechanism for moving the first carriage shown in FIG. 9.

Referring now to FIG. 10, a driving mechanism for a pair of pulleys 215 will be explained. A pair of pulleys 215 are coupled by a shaft 401 through worms 403 and a worm gear 405. Worm gear 405 engages one of worms 403, and is rotated by a pulse motor 407.

Figure 11:
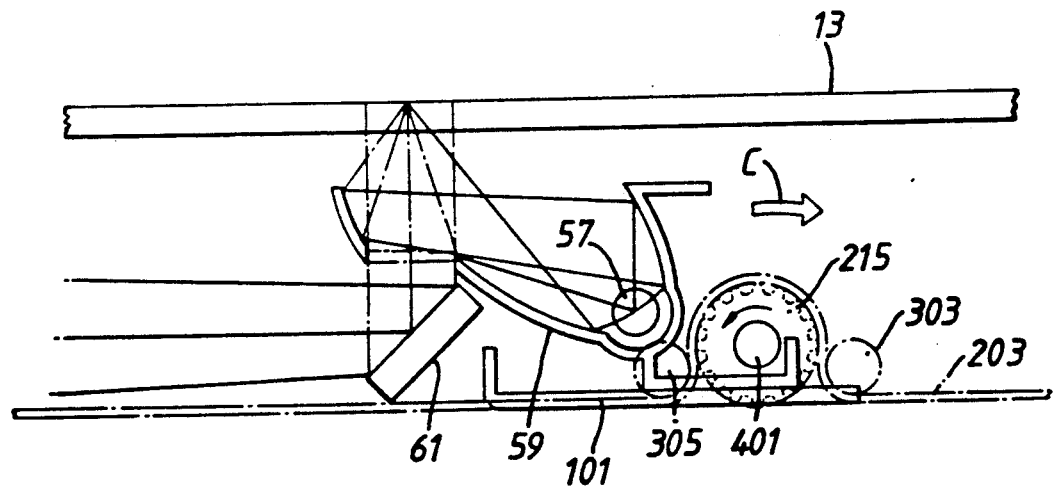
FIGS. 11, 12, and 13 illustrate the movement of the first carriage shown in FIGS. 8 and 9.

As shown in FIGS. 9 and 10, pulley 215 engages with timing belt 203 through idle pulleys 303 and 305. Thus, when pulse motor 201 is activated, timing belt 203 is moved, and pulley 215 is rotated which, in turn, causes movement of first carriage 101. Similarly, if pulley 215 is rotated by activation of pulse motor 407 at a time when pulse motor 201 is not operating, pulley 215 is moved along timing belt 203. For example, if pulley 215 is rotated counterclockwise, as shown in FIG. 11, pulley 215 is moved in the direction of arrow C shown in FIG. 11.

Figure 12:
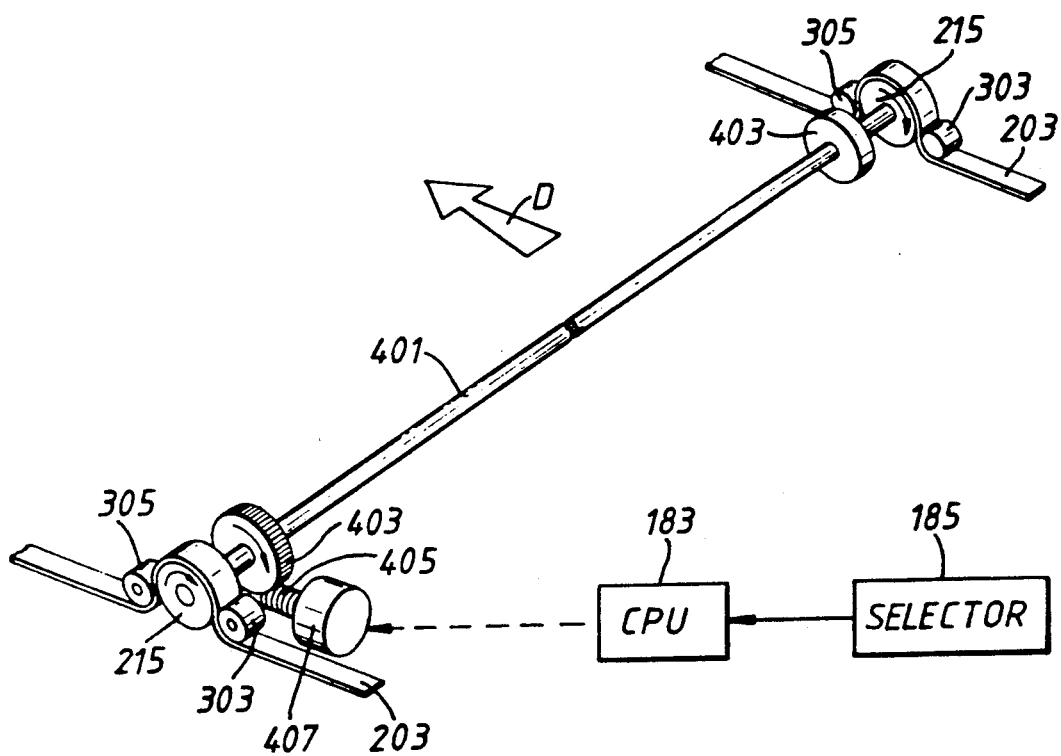

FIG. 12 illustrates the movement of a pair of pulleys 215. In this arrangement, if pulleys 215 are rotated clockwise, pulleys 215 will move along timing belt 203 in the direction of arrow D shown in FIG. 12. As described above, pulleys 215, idle pulleys 303, worms 403, worm gear 405 and pulse motor 407 are also mounted on first carriage 101 (not shown in FIG. 12). As pulley 215 is rotated, first carriage 101 is moved along timing belt 203, i.e., glass table 13. At the same time, timing belt 203 is fixed so that second carriage 103 remains stationary.

The operation of the copying apparatus according to this embodiment will now be explained.

In the left reference operation, the movement of first and second carriages 101 and 103 is the same as that described above with respect to the first embodiment, except that the mechanisms for moving carriages 101 and 103 are those described above with reference to FIG. 7.

In the right reference operation, in response to the operation of selector 181, CPU 183 first controls pulse motor 201 to drive timing belt 203 so that timing belt 203 transports first carriage 101 as far as maximum stroke point 185. At the same time, second carriage 103 is also moved through timing belt 203 at one-half the speed of first carriage 101. This movement is the same as the scanning movement in the left reference operation according to the first embodiment as indicated by the hatched figures in FIG. 5.

CPU 183 then causes pulse motor 407 only to rotate. In response to the rotation of pulse motor 407, pulley 215 is rotated and is moved along timing belt 203 as shown in FIG. 11. First carriage 101 is, thus, moved by length H beyond the maximum stroke point 185 (FIG. 13). Second carriage 103 remains fixed because pulse motor 201 is not activated.

CPU 183 then activates pulse motor 157 (see FIG. 4) to move third carriage 151 having fourth and fifth mirrors 67 and 69 by length H/2, i.e., one half of the moving distance of first carriage 101, as shown in FIG. 13.

Figure 14:
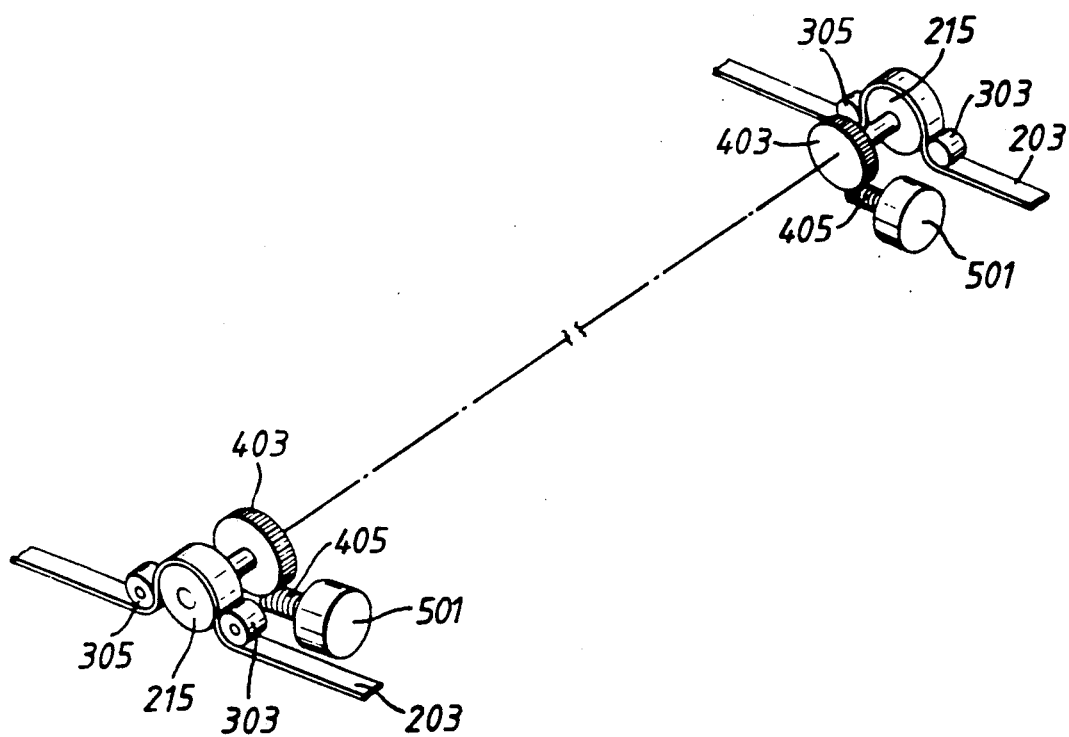
FIG. 14 is a perspective view of a mechanism according to a third embodiment for moving the first carriage shown in FIG. 7.

FIG. 14 illustrates a third embodiment of the present invention. This embodiment is substantially identical to the second embodiment except that a pair of pulse motors 501 are provided for rotating pulleys 215. In this arrangement, pulse motors 501 are simultaneously activated during the copying operation. Each of pulse motors 501 may also be activated before the start of the copying operation to adjust the tilt of shaft 401 of carriage 101.

Other objects, features and advantages of the present invention will become apparent from the above detailed description. It should be understood, however, that the detailed description and specific examples, while indicating preferred embodiments of the invention, are given by way of illustrations only, since various changes and modifications within the spirit and scope of the invention will become apparent to those skilled in the art.

I claim:

1. An optical scanner for scanning an object supported on a glass table and focusing a light image of the object onto a light-receiving medium, the scanner comprising:

light means for illuminating the object;

input mirror means for reflecting a light image reflected by the object;

lens means for focusing the light image reflected by said input mirror means;

output mirror means for reflecting the light image focused by said lens means so that the light image is incident on the light-receiving medium;

means for selecting one of a first operation for starting the scanning from one end of the glass table and a second operation for starting the scanning from the other end of the glass table, the other end of the glass table failing to be scanned in the first operation;

first positioning means for positioning said input mirror means facing the one end of the glass table at the beginning of the first operation, and facing the other end of the glass table at the beginning of the second operation;

second positioning means for positioning said output mirror means at a first position along the lower surface of the glass table at the beginning of the first operation, and at a second position at the beginning of the second operation, third positioning means for positioning said lens means at a third position at the beginning of the first operation, and at a fourth position at the beginning of the second operation, said second and said third positioning means being responsive to the operation of said first positioning means to position said output mirror means and said lens means so that the length of the optical path between the object and said lens means is equal to the length of an optical path between said lens and the light-receiving medium in the first and the second operations, and scanning control means for controlling the movement of said input mirror means from said one end of the glass table toward the other end thereof in the first operation and from the other end of the glass table toward the one end of the glass table in the second operation.

2. The scanner of claim 1 in which said third positioning means positions said lens means along the lower surface of the glass table.

3. The scanner of claim 1 further comprising:

intermediate mirror means disposed in an optical path between said input mirror means and said lens means for reflecting the light image reflected by said input mirror means toward said lens means; and fourth positioning means for positioning said intermediate mirror means along the lower surface of the glass table.

4. The scanner of claim 3 wherein said first positioning means comprises first support means for supporting said input mirror means for movement along said glass table and first moving means operatively coupled to said first support means for reciprocally moving said input mirror means between the opposite ends of said glass table.

5. The scanner of claim 4 wherein said fourth positioning means comprises second support means for supporting said intermediate mirror means for movement along said glass table and second moving means operatively coupled to said first support means and said second support means for reciprocally moving said input mirror means between the opposite ends of said glass table at a first speed and for moving said intermediate mirror means along said glass table at a second speed which is substantially one-half of the first speed.

6. The scanner of claim 3 further comprising a fixed mirror disposed in an optical path between said output mirror means and said light receiving medium for reflecting light from said output mirror means onto the light-receiving medium.

7. The scanner of claim 5 wherein said second moving means comprises:

a timing belt coupled to said first support means;

a pulse motor for rotating said timing belt;

first pulley means engaging said timing belt; and second pulley means coupled to said second support means, and operatively associated with said first support means so that when said pulse motor rotates said timing belt, said second pulley means is driven responsive to movement of said first support means.

8. The scanner of claim 5 further comprising adjusting means for moving said intermediate mirror means along said glass table independently of said input mirror means.

9. The scanner of claim 7 further comprising adjusting means for driving said second pulley means.

10. The scanner of claim 9 wherein said second pulley means comprises:

wire means coupled to said first support means; and a pair of pulleys rotatably coupled to said second support means and engaging said wire means, and wherein said adjusting means comprises means for rotating said wire means.

11. The scanner of claim 5 wherein said second moving means comprises:

a timing belt;

a pulse motor for rotating said timing belt;

first pulley means coupled to said first support means, and engaging said timing belt; and second pulley means coupled to said second support means, and operatively associated with said first support means so that when said pulse motor rotates said timing belt said second pulley means is driven responsive to movement of said first support means.

12. The scanner of claim 11 wherein said first pulley means comprises a pulley coupled to said first support means and engaging said timing belt, and pulley rotating means for rotating said pulley.

13. The scanner of claim 11 wherein said second pulley means comprises a pair of pulleys coupled to said second support means and engaging said timing belt and wherein said timing belt is wound around one of said pair of pulleys in a first direction and said timing belt is wound about the other pulley in a second direction opposite said first direction.

* * * * *